United States Patent

[11] 3,626,037

[72] Inventors David I. Randall;
Robert W. Wynn, both of Easton, Pa.
[21] Appl. No. 710,652
[22] Filed Mar. 5, 1968
[45] Patented Dec. 7, 1971
[73] Assignee GAF Corporation
New York, N.Y.

[54] MONO-2-HALOETHYL ESTERS OF 2-HALOETHANEPHOSPHONIC ACID
2 Claims, No Drawings

[52] U.S. Cl. .................................................... 260/961,
71/86, 260/983, 260/986
[51] Int. Cl. ........................................................ A01n 9/36,
C07f 9/40
[50] Field of Search ............................................ 260/961

[56] References Cited
UNITED STATES PATENTS
2,708,204 5/1955 Bell et al. ...................... 260/961 X
3,296,132 1/1967 Petersen et al. ............... 260/961 X Primary Examiner—Joseph P. Brust
Assistant Examiner—Richard L. Raymond
Attorneys—George L. Tone, Homer J. Bridger, Martin A. Levitin, Samson B. Leavitt and Walter C. Kohm ABSTRACT: Mono-2-haloethyl esters of 2-haloethanephosphonic acid represented by the formula:

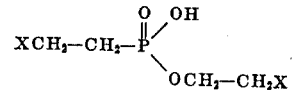

wherein both X's represent the same halogen, i.e. either bromine or chlorine, preferably chlorine. The compounds are plant growth regulators comparable 2-chloroethanephosphonic acid.

MONO-2-HALOETHYL ESTERS OF 2-HALOETHANEPHOSPHONIC ACID

This invention relates to new and useful mono-2-haloethyl esters of 2-chloroethanephosphonic acid, and more particularly to the mono-2-chloroethyl ester of 2-chloroethanephosphonic acid, sometimes also called 2- or beta-, chloroethylphosphonic acid.

Such mono-2-haloethyl esters of chloroethanephosphonic acid, either alone or in admixture with the 2-chloroethanephosphonic acid per se, or various other esters of such acid, have been found to be plant growth regulators comparable in activity to 2-chloroethanephosphonic acid per se.

The novel mono-2-haloethyl esters of 2-chloroethanephosphonic acid may be prepared in good yield and purity from the corresponding bis-(2-haloethyl ester) of 2-chloroethanephosphonic acid in several ways. Thus, the bis-(2-haloethyl ester) of 2-chloroethanephosphonic acid may first be converted to monohaloethyl ester of 2-chloroethanephosphonyl chloride by reaction with $PCL_5$, as illustrated in Equation I below:

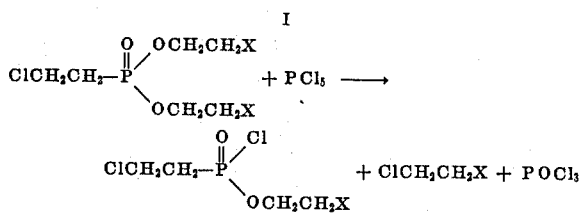

and the thus obtained phosphonyl chloride hydrolyzed to the desired mono-2-haloethyl ester of 2-chloroethanephosphonic acid, as illustrated in equation II:

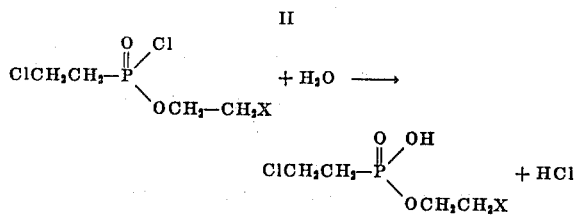

Alternatively, the bis 2-haloethyl ester of 2-chloroethanephosphonic acid may be partially cleaved by reaction with HCl to produce the desired mono-2-haloethyl ester of 2-chloroethanephosphonic acid, as illustrated in equation III:

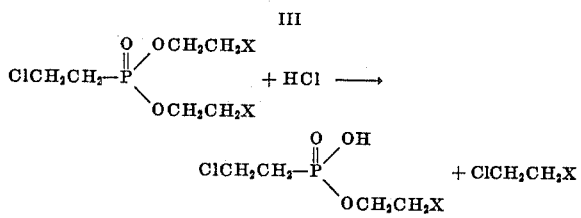

In the foregoing equations I, II and III, X represents bromine or chlorine.

The details of the preparation of the novel compounds of the present invention will be apparent from a consideration of the following specific examples which are illustrative of preferred embodiments thereof.

EXAMPLE 1

In the manner illustrated in equations I and II above, the mono-2-chloroethyl ester of 2-chloroethanephosphonic acid was prepared in the following manner:

A 250 cc., 4-necked flask equipped with stirrer, thermometer, nitrogen inlet, and ¾inch ×12 inches vigreaux column to distillation head was charged with 53.9 g. (0.2 moles) of the bis-(2-chloroethyl ester) of chloroethanephosphonic acid. Maintaining the temperature below 80° C., with stirring, there was added portionwise in 10 minutes 43.7 g. (0.22 mole) of phosphorus pentachloride under a nitrogen blanket. After the addition was completed the mixture was refluxed at a pot temperature of 112°–113° C. for 2 hours. The volatile material was then removed by distillation under a nitrogen stream to a pot temperature of 156° C. The residue, 51.4 g., was distilled at reduced pressure. After a forerun of 3.6 g., removed at 118°–125° C. at 2.0 mm., 34.6 g. (77 percent theory) of the mono-2-chloroethyl ester of 2-chloroethanephosphonyl chloride was obtained boiling at 126°–129° C. at 2.2 mm. Hg.

The thus obtained phosphonyl chloride was then hydrolyzed to the free acid in the following manner:

10.5 g. of the thus obtained phosphonyl chloride was stirred with 100 cc. of distilled water while warming on steam bath. In 10 minutes dissolution was complete. 9.0 g. of the mono-2-chloroethyl ester of 2-chloroethanephosphonic acid was obtained in pure form, by removing the water via a rotary flask evaporator, as a clear colorless viscous oil. The titration curve was typical for a monofunctional strong acid. The neutral equivalent gave the correct molecular weight for the formula:

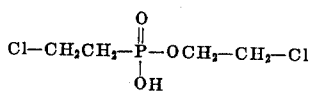

Nuclear Magnetic Resonance analysis confirmed the structure, as did elemental analysis.

EXAMPLE 2

In the manner illustrated in equation III above, the mono-2-chloroethyl ester of 2-chloroethanephosphonic acid was prepared by the following procedure:

100 parts of crude bis-(2-chloroethyl ester) of chloroethanephosphonic acid are charged into a 4-neck flask equipped with stirrer inlet tube, condenser and thermometer. At 160° C. anhydrous HCl gas is passed through for about 15 hours at a good rate. Excess HCl gas is adsorbed in a scrubbing tower and the 1,2-dichloroethane evolved is collected. There was thus obtained 70 g. of a viscous, clear liquid, which analyzed about 40 percent 2-chloroethanephosphonic acid and 40 percent of mono-2-chloroethyl ester of 2-chloroethane phosphonic acid. This mixture, of the betachloroethanephosphonic acid and the mono-2-chloroethyl esters thereof, exhibited plant growth regulator activity similar to that exhibited by the two components of the mixture. The pure mono-2-chloroethyl ester of 2-chloroethanephosphonic acid was recovered from the mixture by extraction with benzene. The ester being readily soluble in benzene, was removed in solution in the benzene from the 2-chloroethanephosphonic acid which was essentially insoluble in the benzene. After removal of the benzene by evaporation under vacuum, the thus recovered mono-2-chloroethyl ester of 2-chloroethanephosphonic acid was found to be identical with the product obtained in example 1.

While the foregoing examples illustrate the preparation of the preferred mono-2-chloroethyl ester of 2-chloroethanephosphonic acid, it will be understood that the 2-bromoethyl ester may be prepared in an analogous manner and yield, by starting with the bis-(2-bromoethyl ester) of 2-bromoethanephosphonic acid.

As stated above, the mono-2-haloethyl esters of 2-chloroethanephosphonic acid, particularly the mono-2-chloroethyl ester thereof, are especially valuable for use as a plant growth regulator by application to plants, either alone or in admixture with the 2-chloroethanephosphonic acid, in essentially any proportions, i.e. in relative proportions of the monoester to acid of from 1:99 to 99:1, although as a practical matter, it is preferred to employ such mixtures in the ratio of 1:9 to 9:1 by weight.

The effect of the mono-2-chloroethyl ester of 2-chloroethanephosphonic acid on living plants and its manner of use thereon is essentially the same as that of the 2-chloroethanephosphonic acid per se. This effect and use is more fully described in copending application Ser. No. 617,860 filed Feb. 23, 1967 and now abandoned by Charles D. Fritz and Wilbur F. Evans, entitled "Growth Regulator Process Utilizing Phosphonic Compounds," and the application of Anson R. Cooke, Ser. No. 659,310, filed Aug. 9, 1967, and now abandoned entitled "Method of Initiating Flowering," and the disclosure of said copending applications are therefore incorporated in the present application by reference.

We claim:
1. Mono-2-haloethyl esters of 2-haloethanephosphonic acid represented by the formula:

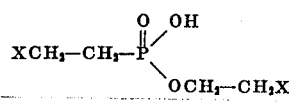

wherein X represents bromine or chlorine.

2. The mono-2-chloroethyl ester of 2-chloroethanephosphonic acid.